(12) United States Patent
Lust et al.

(10) Patent No.: US 7,359,059 B2
(45) Date of Patent: Apr. 15, 2008

(54) CHIP SCALE ATOMIC GYROSCOPE

(75) Inventors: Lisa M. Lust, Plymouth, MN (US); Dan W. Youngner, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 134 days.

(21) Appl. No.: 11/419,052

(22) Filed: May 18, 2006

(65) Prior Publication Data

US 2007/0266784 A1  Nov. 22, 2007

(51) Int. Cl.
*G01C 19/64* (2006.01)
(52) U.S. Cl. ...................................... 356/459
(58) Field of Classification Search ................ 356/459, 356/369; 250/231.12
See application file for complete search history.

(56) References Cited

U.S. PATENT DOCUMENTS

| 4,104,577 A | 8/1978 | Greenwood |
| 4,147,974 A | 4/1979 | Greenwood |
| 4,157,495 A | 6/1979 | Grover et al. |
| 4,403,190 A | 9/1983 | Greenwood |

(Continued)

FOREIGN PATENT DOCUMENTS

GB  2137357 A  10/1984

(Continued)

OTHER PUBLICATIONS

Arinmondo et al., "Nonabsorbing Atomic Coherences by Coherent Two-Photon Transitions in a Three-Level Optical Pumping," Lettere Al Nuovo Cimento Della Societa Italiana Di Fisica, vol. 17, No. 10, 8 pages, Nov. 6, 1976.

(Continued)

*Primary Examiner*—Michael A. Lyons

(74) *Attorney, Agent, or Firm*—Black Lowe & Graham PLLC

(57) ABSTRACT

A chip-scale atomic gyroscope and methods for sensing and measuring mechanical rotation of an object are disclosed. The chip-scale atomic gyroscope can include a vapor cell including a vapor cavity adapted to contain a vaporized source of alkali-metal atoms and noble gas atoms, a pump laser source adapted to produce a first laser beam along an optical pumping axis for optically pumping the alkali-metal atoms within the vapor cavity to an excited state, and a sense laser source adapted to produce a second laser beam along a sense axis transverse to the optical pumping axis for probing the polarization angle of the noble gas atoms within the vapor cavity. The pump and sense laser sources can each be connected to a servo mechanism, which can be configured to maintain the laser beams at a wavelength corresponding to the carrier wavelength of the alkali-metal atoms and a wavelength detuned from the carrier wavelength.

19 Claims, 5 Drawing Sheets

U.S. PATENT DOCUMENTS

| | | |
|---|---|---|
| 4,406,986 A | 9/1983 | Greenwood |
| 4,430,616 A | 2/1984 | Grover |
| 4,446,428 A | 5/1984 | Kwon et al. |
| 4,450,407 A | 5/1984 | Kwon et al. |
| 4,454,482 A | 6/1984 | DeMarchi |
| 4,461,996 A | 7/1984 | Kwon |
| 4,509,014 A | 4/1985 | Karwacki et al. |
| 4,525,672 A | 6/1985 | Lam et al. |
| 4,544,891 A | 10/1985 | Karwacki |
| 4,874,942 A | 10/1989 | Clauser |
| 4,992,656 A | 2/1991 | Clauser |
| 5,107,226 A | 4/1992 | Pascaru |
| 5,387,881 A | 2/1995 | Schweda et al. |
| 5,657,340 A | 8/1997 | Camparo et al. |
| 6,255,647 B1 | 7/2001 | Vanier et al. |
| 6,263,002 B1 | 7/2001 | Hsu et al. |
| 6,265,945 B1 | 7/2001 | Delaney et al. |
| 6,320,472 B1 | 11/2001 | Vanier |
| 6,347,108 B2 | 2/2002 | Jiang et al. |
| 6,900,702 B2 | 5/2005 | Youngner et al. |
| 2001/0021214 A1 | 9/2001 | Jiang et al. |
| 2004/0035182 A1* | 2/2004 | Kadlecek .................... 73/23.2 |

FOREIGN PATENT DOCUMENTS

WO     WO2006069116 A     6/2006

OTHER PUBLICATIONS

Happer, "Depart of Defense Contributions to U.S. Science and Technology," Optics and Photonics News, pp. 35-39, Nov. 2004.

Jafferis et al., "Optical Pumping," 24 pages, Jan. 17, 2004.

Jau et al., "Push-Pull Optical Pumping of Pure Superposition States," Physical Review Letters, vol. 93, No. 16, 4 pages, Oct. 2004.

Kitching et al., IEEE Transactions on Instrumentation and Measurement, vol. 49, No. 6, pp. 1313-1317, Dec. 2000.

\* cited by examiner

CHIP SCALE ATOMIC GYROSCOPE

GOVERNMENT SUPPORT

This invention was made with government support under DARPA contract number N66001-02-C-8019. The government may have certain rights in the invention.

FIELD

The present invention relates generally to the field of atomic-based sensing devices. More specifically, the present invention pertains to chip-scale atomic gyroscopes and methods for orientation and rate sensing.

BACKGROUND

Gyroscopes are utilized in a wide variety of applications for sensing orientation and/or inertial motion of objects. In the design of navigational and communications systems, for example, such devices are useful in sensing slight variations in linear and rotational motion of an object traveling through space. Navigational grade gyroscopes, for instance, enable desired flight paths to be followed with a high degree of accuracy, particularly in those environments where GPS guidance is unavailable.

The area of gyroscope design has encompassed a vast arena of technologies, including mechanical, fiber optics, and ring laser based designs. More recent trends have emphasized ultra compact, high performance architectures such as microelectromechanical systems (MEMS) based devices, which utilize semiconductor fabrication techniques to form miniaturized components on the surface of a wafer. In one such design often referred to as a MEMS vibratory-rate gyroscope, for example, a resonating structure such as a proof mass is suspended by a flexure anchored to a substrate such as a wafer of silicon or glass. Commonly implemented suspension structures may include interdigitated combs, cantilevered beams, disks, and/or ring structures. To sense displacement or acceleration in response to movement of the device about a rate axis, the proof mass is typically driven into a high-Q resonance state using a number of drive electrodes. Under angular rotation, the Coriolis force resulting from motion of the device about the rate axis induces motion in the direction of a sense axis perpendicular to the proof mass motion, which can then be capacitively sensed and outputted as a rate signal.

Since mechanical gyroscopes such as MEMS vibratory-rate gyroscopes are often operated in high-Q shock environments, such devices are prone to drift over time due to aging, material degradation and stress, leading to scale factor instability in the gyroscope. In some cases, cross-coupling stiffness and damping between the drive and sense directions can affect the performance of the gyroscope, leading to bias drift issues. In addition, the susceptibility of the suspension structures to shock and vibration can further affect the ability of the device to accurately sense subtle changes in orientation and/or angular rotation. Due to the relatively small capacitive sense signals outputted and measured, MEMS vibratory-rate gyroscopes often demand highly stable and accurate sense electronics, resulting in increased power consumption and manufacturing complexity.

To overcome many of the drawbacks associated with mechanical gyroscopes, atomic-based gyroscopes have been proposed which rely on the precession rates of alkali-metal atoms to sense and measure angular rotation. In one illustrative design often referred to as a Larmor precession gyroscope, a vapor cavity filled with an alkali metal and two noble gas isotopes are used to sense rotation. In a non rotating frame, a static magnetic field is applied and the isotopes are spin-aligned using optical pumping. Two perpendicular oscillating magnetic fields are then applied with frequencies near the Larmor precession frequency for each isotope, inducing a precession about the static magnetic field that can be measured using magneto-optical techniques. As the system undergoes rotation, the angular velocity alters the precession frequency, which may then be extracted numerically to determine the rotation rate of the gyroscope.

One significant issue with Larmor precession gyroscopes is that they require the use of two separate isotopes with similar relaxation time constants in order to extract the rotation angle accurately. In some designs, for example, two different nuclei each having a different gyromagnetic ratio can be configured to precess at different rates in an applied magnetic field. The mechanical rotation rate of the gyroscope is then deduced by simultaneously tracking the precession rates of each nuclei, and then subtracting out the magnetic field contribution from the measured angular precession rate. Such proposed designs, however, have been difficult to implement in practice since minor magnetic field gradients can cause the atoms to precess at different rates, causing fluctuations in the output. Moreover, differences in the relaxation rates can cause the isotopes to lose spin coherence at different rates leaving the system in a highly convoluted unknown state. Since such gyroscopes required synchronous precession information from both isotopes, high signal fidelity is also difficult in such designs. These aspects, coupled with the device's high cross-axis sensitivity and extreme sensitivity to magnetic gradients and transients, result in a complex system whose angular rotation is difficult to extract under normal fielded 3-axis rotational motion. Accordingly, there is a need for improved atomic sensors for use in orientation and/or rate sensing.

SUMMARY

The present invention pertains to chip-scale atomic gyroscopes and methods for orientation and rate sensing. An illustrative chip-scale atomic gyroscope can include a vapor cell having a vapor cavity adapted to contain a vaporized source of alkali-metal atoms, noble gas atoms and one or more buffer gasses. The vapor cell can be contained within a packaging structure of the gyroscope by inclusion of a separate enclosed cavity or cavities. In other embodiments, the vapor cell may be defined by a multi-wafer stack. A number of storage chambers for storing a supply of alkali-metal atoms and noble gas atoms may also be defined. In some embodiments, a number of nested shields can be provided about the packaging structure for magnetic and thermal shielding. The packaging structure may further include one or more other elements such as a magnetic field source and a heater source.

A pump laser source adapted to produce a pump laser beam along an optical pumping axis of the gyroscope can be utilized to optically pump the alkali-metal atoms within the vapor cavity to an excited state. In some embodiments, for example, the laser beam outputted by the pump laser source can be maintained at a wavelength corresponding to the carrier wavelength of the alkali-metal atoms, producing an angular momentum in the alkali-metal atoms that induces a nuclear spin polarization in the noble gas atoms. Lock-in of the pump laser source to the carrier wavelength of the alkali-metal atoms can be accomplished, for example, via a servo mechanism adapted to receive feedback signals from a light detector in optical communication with the pump laser beam and vapor cavity.

A sense laser source can be further configured to produce a second laser beam along a probe axis transverse to the optical pumping axis for probing the polarization angle of the noble gas atoms within the vapor cavity. Sensing of the polarization angle of the noble gas atoms can be accomplished via a polarimetry technique using at least two perpendicular polarization filters in optical communication with the sense laser beam and a second light detector. The sense laser source can be locked to a detuned wavelength of the alkali-metal atoms via a second servo mechanism adapted to receive feedback signals from the second light detector.

An illustrative method of sensing and measuring mechanical rotation of a moving object using the atomic gyroscope may include the steps of optically pumping the alkali-metal atoms within the vapor cavity to an excited state and inducing a nuclear spin polarization in the noble gas atoms through hyperfine spin exchange, directing a sense laser beam transverse to the pump laser beam for probing the polarization angle of the noble gas atoms within the vapor cavity, measuring the rotation angle of the noble gas atoms within the vapor cavity, and then outputting a measure of the mechanical rotation of the gyroscope.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

Figure 1:
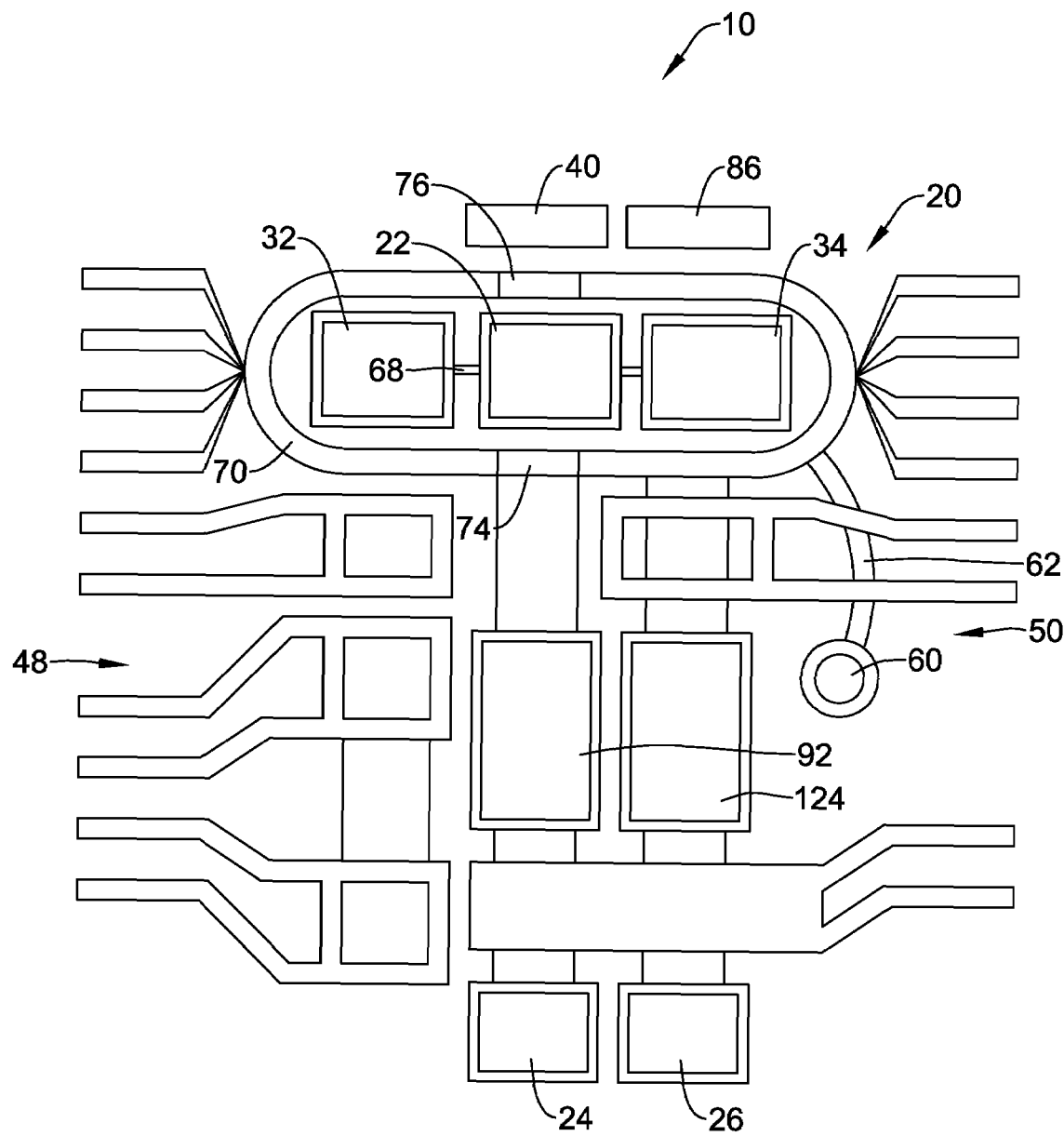
FIG. 1 is a top schematic view of a chip-scale atomic gyroscope in accordance with an illustrative embodiment of the present invention.
Figure 2:
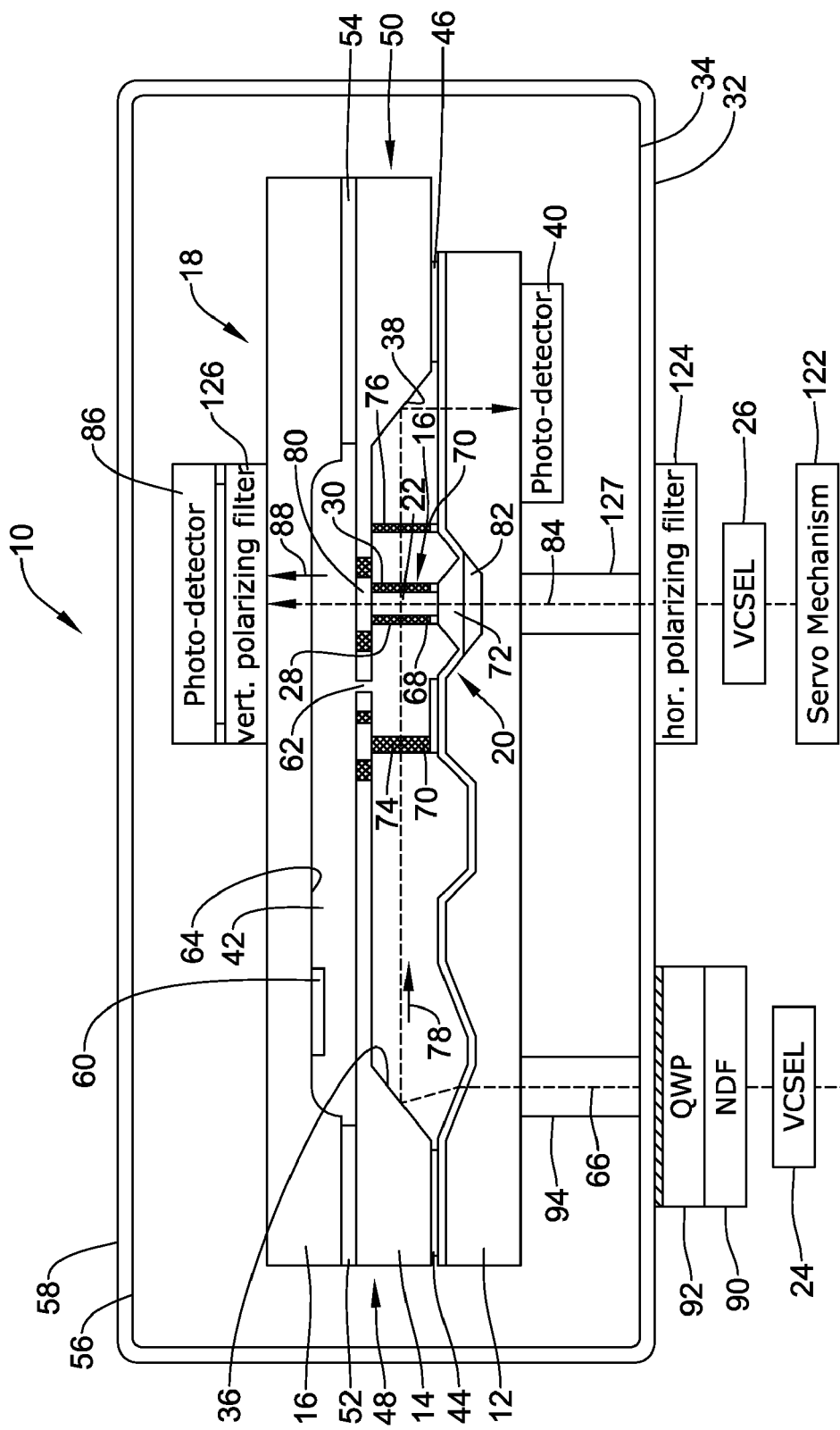
FIG. 2 is a side schematic view of the illustrative chip-scale atomic gyroscope of FIG. 1.

FIGS. 1-2 are top and side schematic views, respectively, showing a chip-scale atomic gyroscope 10 in accordance with an illustrative embodiment of the present invention. As shown in FIGS. 1-2, the atomic gyroscope 10 can be fabricated from a three-wafer stack including a lower wafer substrate 12, a middle wafer substrate 14, and an upper wafer substrate 16, which together form a packaging structure 18 configured to support a number of optical and electrical components for use in sensing orientation and/or angular rotation by monitoring the effects of external rotations on alkali-metal atoms and noble gases. For example, and as discussed in greater detail below, the atomic gyroscope 10 can include a vapor cell 20 having a vapor cavity 22 containing an alkali-metal, a noble gas isotope specie, and a suitable buffer gas. The atomic ensemble can be optically pumped into an excited state using a pump laser source 24, causing the alkali-metal atoms within the vapor cavity 22 to acquire angular momentum which is then transferred to the nuclei of the noble gas isotopes. A sense laser source 26, in turn, can be used to determine the relative change in polarization angle of the isotopes, allowing the mechanical rotation of the atomic gyroscope 10 to then be measured.

The lower wafer substrate 12 of the packaging structure 18 may be formed from a glass material, and may provide the structural basis for the various optical and electrical components of the atomic gyroscope 10. The middle wafer substrate 14, in turn, may be formed from silicon, and can be configured to support the various sidewalls 28,30 of the vapor cavity 22 as well as several vacuum filled chambers 32,34 for storage of the alkali-metal atoms and noble gas isotopes, respectively. Alternatively, and in other embodiments, the middle wafer substrate 14 of the packaging structure 18 can be configured to support the vapor cavity 22 in situ, which would be inserted into the wafer stack. The middle wafer substrate 14 may further include a number of mirrored surfaces 36,38 for redirecting the laser beam emitted from the pump laser source 24 into the vapor cavity 22 and subsequently to a photodetector 40. The upper wafer substrate 16 can be formed from a glass, and provides a thermally isolative vacuum enclosure 42 for the vapor cell 20 that permits the atomic gyroscope 10 to operate at relatively low power levels and in environments having a temperature range of between about −55° C. to about +85° C. Fabrication of the various wafer substrates 12,14,16 can be accomplished using semiconductor fabrication techniques commonly used in MEMS fabrication such as lithography or surface micromachining.

The lower wafer substrate 12 can be connected to the middle wafer substrate 14 via a number of solder and/or adhesive bonds 44,46 located at or near each end 48,50 of the atomic gyroscope 10. The upper wafer substrate 16, in turn, can be connected to the middle wafer substrate 14 via a second number of solder and/or adhesive bonds 52,54 similarly located at or near each end 48,50 of the atomic gyroscope 10. Other connection means can be further provided to optically and electrically connect the various components of the atomic gyroscope 10 to other external devices, if desired. In some embodiments, for example, optical and/or electrical feedthroughs can be provided at the periphery of the packaging structure 18 to permit the atomic gyroscope 10 to be connected to an inertial measurement unit (IMU).

While the atomic gyroscope 10 is relatively insensitive to fast transients and gradients, the presence of external DC and/or low frequency magnetic fields can introduce bias into the servo controlled field cancellation mechanism used by the gyroscope 10 to induce nuclear magnetic resonance (NMR). To attenuate magnetic field interference, the packaging structure 18 can be formed or encased within a number of nested shields that can be configured to both magnetically and thermally shield the various components of the atomic gyroscope 10. In the illustrative embodiment of FIGS. 1-2, for example, two such shields 56,58 are schematically depicted encasing the components of the atomic gyroscope 10. A greater or lesser number of shields may be provided, however, depending on the operating environment of the atomic gyroscope 10. The configuration of the shields 56,58 will typically vary depending on the characteristics of the magnetic field. A single axis field coil can be used, for example, to achieve total field cancellation to null first order effects resulting from any magnetic field interference. A nested 3-axis 3-coil configuration, in turn, may be used to null second order effects resulting the magnetic field interference. In some embodiments, the laser sources (24,26) may be located outside of the shields 56,58, in which case the optical signals may be fed through the shields 56,58.

The shields 56,58 may be formed from a suitable material impermeable to the DC and low frequency magnetic fields. In some embodiments, for example, each shield 56,58 may comprise a Supermalloy or Permalloy® material having a composition of nickel and iron, which is impervious to the magnetic field gradients and transients common in many gyroscopic applications. It should be understood, however, that other materials may be used in forming the shields 56,58, if desired. To further aid in screening, the optical and electrical feedthroughs can be passed through the shields 56,58 in a zigzag configuration, further preventing the introduction of magnetic fields into the interior of the packaging structure 18.

The atomic gyroscope 10 may further include a getter material 60 such as titanium for capturing any residual oxidizing liquids and/or gasses contained within packaging structure 18. The getter material 60 can be formed, for example, within the upper vacuum chamber 42 of the atomic gyroscope 10, and can be in communication with the vapor cell 20 via a small opening or tunnel 62. The getter material 60 can be formed by depositing encapsulated getter dots onto an interior surface 64 of the upper wafer substrate 16, and then melting or heating the encapsulated getter material 60 once the wafer substrates 12,14,16 have been hermetically sealed to release the fresh getter. In use, the getter material 60 can be used to chemically sorb any contaminants within the packaging structure 18 that may result from the outgassing of common atmospheric gasses and packing-material vapors during processing, and/or by the diffusion or microleaking of such materials into the packaging structure 18 over time.

The vapor cell 20 can be formed at least in part over the lower wafer substrate 12 using a suitable process such as etching. In certain techniques, for example, a transparent oxide such as silicon dioxide ($SiO_2$) can be grown or deposited over the lower wafer substrate 12, forming a portion of the vapor cell 20. The vapor cell 20 can be divided generally into one or more storage chambers 32,34 and a vapor cavity 22. The storage chambers 32,34 can be configured to function as holding chambers for the alkali-metal atoms and noble gas atoms, respectively, which can be deposited within the storage chambers 32,34 and capped with a passivation layer such as an aluminum layer. Alternatively, the storage chambers 32,34 may be formed outside of the wafer stack using suitable geometries and materials, and then inserted into the stack during processing of the wafer stack. The vapor cavity 22, in turn, is in communication with the laser beam 66 from the pump laser source 24 and with the photodetector 40, and can be connected to the source of alkali-metal atoms deposited within holding storage chamber 32 via a small opening or tunnel 68. When heated, the alkali-metal atoms within the storage chamber 32 can be configured to vaporize and fill the vapor cavity 22. Typically, the vapor pressure of the alkali-metal is sufficient to cause the vaporized alkali-metal to fill the vapor cavity 22 to a saturation vapor pressure at a desired operating temperature, such as at, for example, 200° C. The precise temperature at which saturation vapor pressure is achieved will typically vary, however, depending on the composition of the atomic ensemble, the size of the vapor cavity 22, as well as other factors.

The vapor cell 20 can be surrounded by or encased within one or more walls or layers 70 made of a high thermal conductivity material, forming a thermal enclosure that acts as a thermal isolation gap to keep the temperature within the vapor cavity 22 stable. A thermal bridge 72 can also be provided adjacent the vapor cell 20 to help maintain a stable temperature within the vapor cavity 22. In some embodiments, a number of active heating elements (not shown) can be utilized to heat the vapor cell 20 in order to maintain the operating temperature within the vapor cavity 22 at a constant temperature (e.g. at +200° C.). The heating elements may include, for example, a wire winding, a power transistor in heat dissipation mode, or other suitable means for providing heat to the vapor cell 20. A temperature sensor can be utilized to provide feedback to a temperature controller, which regulates the current through the wire winding to maintain the alkali-metal atoms at the desired temperature.

A thermal isolation structure such as that described in co-pending U.S. patent application Ser. No. 11/276,538, entitled "Passive Analog Thermal Isolation Structure", can be formed on or coupled to one of the wafer substrates 12,14,16 to assist in providing thermal isolation from the environment. The thermal isolation structure is capable of closely controlling the temperature within the vapor cavity 22 while using lower levels of heating power, reducing the total power consumption required to operate the atomic gyroscope 10.

A number of window apertures 74,76 disposed on each side of the vapor cell 20 can be configured to permit the laser beam 66 from the pump laser source 24 to be transmitted through the walls 70 of the vapor cell 20 and to the photodetector 40 along the direction of an optical pumping axis 78. A second number of window apertures 80,82 disposed on the top and bottom portions of the vapor cell 20, in turn, can be configured to permit the laser beam 84 from the sense laser source 26 to be transmitted upwardly through the vapor cell 20 to a second photodetector 86 along the direction of a sense axis 88 perpendicular to the optical pumping axis 78. The window apertures 74,76,80,82 can be formed from an optically transparent material such as glass, fused silica, quartz, and/or sapphire, which permits the laser beam to pass through the apertures 74,76,80,82 without a shift in the hyperfine frequency of the alkali-metal atoms. The window apertures 74,76,80,82 can be fabricated, for example, using an etching technique such as Deep Reactive Ion Etching (DRIE), and can be hermetically sealed together with a Pb—Sn reflow solder. In certain embodiments, the window apertures 74,76,80,82 can be fabricated using an etching technique described in co-pending U.S. patent application Ser. No. 11/164,445, entitled "Miniature Optically Transparent Window", which is incorporated herein by reference in its entirety. It should be understood, however, that other fabrication techniques could be utilized, if desired.

The vapor cavity 22 may contain a supply of alkali-metal atoms such as $^{85}Rb$, $^{87}Rb$ or $^{133}Cs$, a noble gas isotope such as $^{129}Xe$, $^{131}Xe$ or $^{3}He$, and a suitable buffer gas such as $N_2$, Ar, Kr, and/or Ne for reducing dephasing collisions within the vapor cavity 22. The selection of the alkali-metal, noble gas and/or buffer gas may vary, however, depending on the particular application. The combination of alkali-metal atoms and noble gas atoms, for example, can be used to provide a wide range of spin-exchange coupling constants, which can be implemented to provide a desired characteristic to the atomic gyroscope 10. Such combination can also be selected to alter the relaxation time constants used by the atomic gyroscope 10, which, in turn, affects the pressure within the vapor cavity 22.

The scale factor of the atomic gyroscope 10 can be altered by adjusting the wavelength of the sense laser beam 84 and/or the vapor pressure of the alkali-metal atoms within the vapor cavity 22. In some embodiments, for example, a vapor pressure change can be accomplished by regulating the cell temperature within the vapor cavity 22. The density of alkali-metal atoms, noble gas atoms, and/or buffer gas atoms can also be controlled to regulate the vapor pressure within the vapor cavity 22, thus controlling scale factor. In some embodiments, for example, the density of the noble gas atoms within the vapor cavity 22 can be stoichiometrically controlled to balance the polarization transfer and signal levels of the atomic gyroscope 10.

The pressure of the buffer gas must similarly be adjusted to minimize the influence of the vapor cavity walls 28,30 on the rotating atoms. In some embodiments, a mineral oil or other suitable material can be used to coat the interior walls of the vapor cavity 22, which can be used to control the spin destruction rate of the alkali-metal atoms due to factors such as gas density and thermal velocity. Other system properties such as pump time and signal level are also dependent at least in part on the relative pressure of the buffer gas within the vapor cavity 22.

The pump laser source 24 may be located adjacent to the packaging structure 18, and can be configured to optically pump the atomic ensemble within the vapor cavity 22 to produce an angular momentum in the alkali-metal atoms that induces a nuclear spin polarization in the noble gas atoms. In some embodiments, for example, the pump laser source 24 may include a vertical cavity surface emitting laser (VCSEL), which can operate at the carrier wavelength of the alkali-metal atoms while consuming relatively low amounts of power. Other suitable laser sources may be used to optically pump the vapor cavity 22, however. An example of an alternative laser source may include a Distributed Bragg Reflector (DBR), which uses a gallium-arsenic (GaAs) semiconductor laser diode to produce laser radiation. To permit optical pumping within the vapor cavity 22, the pump laser source 24 can be configured to continuously output polarized light near the carrier wavelength of the alkali-metal atoms. In those embodiments where $^{87}$Rb or $^{85}$Rb is used as the source of alkali-metal atoms, for example, the pump laser source 24 will typically be held at a wavelength of approximately 795 nm, which corresponds with the D1 absorption line for the rubidium atoms.

In the illustrative embodiment of FIGS. 1-2, the laser beam 66 emitted from the pump laser source 24 is directed through an electrochromic or passive neural density filter 90, which can be used to attenuate the laser beam intensity. A quarter wave plate 92, in turn, can be configured to convert the linearly polarized light emitted from the pump laser source 24 into circularly polarized light. Other optical modifier elements may be used to alter the characteristics of the laser beam in a desired manner. Examples of such elements may include, but are not limited to, beam expanders, collimators, attenuators, focusing lenses, or the like.

The circularly polarized light outputted from the quarter wave plate 92 can be directed through an optical fiber or wave guide 94, which directs the laser beam into the interior of the lower wafer substrate 12. Once passed through the lower wafer substrate 12, the laser beam 66 is then deflected against a first mirrored surface 36 on the middle wafer substrate 14, and through the vapor cavity 22. The laser beam 66 passed through the vapor cavity 22 is then directed against a second mirrored surface 38 on the middle wafer substrate 14, which redirects the laser beam 66 to the photodetector 40.

During operation, and as further discussed below, the laser beam 66 from the pump laser source 24 can be used to optically pump the alkali-metal atoms within the vapor cavity 22, forcing both the alkali metal atoms and the noble gas to spin-align along the direction of the optical pumping axis 78. Optical pumping of the alkali-metal atoms within the vapor cavity 22 can be accomplished by locking the wavelength of the laser beam emitted by the pump laser source 24 to the precise carrier wavelength of the alkali-metal atoms within the vapor cavity 22. In those embodiments where $^{87}$Rb is used for the source or alkali-metal atoms, for example, the pump laser source 24 can be locked to a carrier wavelength of approximately 794.97 nm, which corresponds to the hyperfine frequency of the rubidium atoms. The carrier wavelength will typically vary, however, for other types of alkali-metal atoms such as $^{133}$Cs, $^{23}$Na, or $^{39}$K. Lock-in of the pump laser source 24 to the carrier wavelength can be accomplished, for example, using a servo mechanism 96 configured to regulate the current supplied to the pump laser source 24 based on feedback signals from the photodetector 40. Other means for locking the pump laser source 24 at the carrier wavelength can be used, however, depending on the application.

As can be further seen in FIGS. 1-2, the sense laser source 26 may be located adjacent to the packaging structure 18, and can be configured to produce a laser beam 84 that can be used to sense the rotation of the noble gas atoms resulting from optical pumping of the alkali-metal atoms via the pump laser source 24. As indicated generally by arrow 88, the laser beam 84 emitted from the sense laser source 26 can be directed into the vapor cavity 22 transverse to the laser beam 66 used for optical pumping. In some embodiments, the wavelength of the laser beam emitted from the sense laser source 26 can be detuned to the carrier wavelength of the alkali-metal atoms and the wavelength locked using a servo mechanism 122 configured to receive feedback signals from the second photodetector 86.

During operation, the rotation of the noble gas atoms can be measured using a polarimetry technique in which a set of perpendicular polarizing filters 124,126 are employed to null the sense beam radiation. In the illustrative embodiment of FIGS. 1-2, for example, a horizontal polarizing filter 124 and vertical polarizing filter 126 can be used to null the sense laser beam 84. Other optical modifying elements such as an optical fiber or wave guide 127 can be further provided in optical communication with the laser beam 84 emitted from the sense laser source 26, if desired. As the sense beam 84 passes upwardly through the vapor cavity 22, its polarization is rotated by an amount that depends on the projected field strength of the sense radiation along the sense axis 88, which in turn, is a function of the mechanical rotation angle of the atomic gyroscope 10.

The polarization rotation of the sense beam radiation thus provides a signal that is proportional to the net mechanical rotation angle of the atomic gyroscope 10.

FIGS. 3A-3D are schematic views showing the operation of the illustrative atomic gyroscope 10 of FIGS. 1-2 using a source of $^{87}$Rb alkali-metal atoms and $^{129}$Xe noble gas atoms. As shown in an initial start-up position at time t=0 in FIG. 3A, the laser beam emitted from the pump laser source 24 is directed through the filter 90 and into the quarter wave plate 92, which converts the linearly polarized laser beam into circularly polarized laser radiation. The wavelength of the laser beam outputted by the pump laser source 24 can be regulated to correspond to the transition from the $^2S_{1/2}$ ground state of the $^{87}$Rb atoms to their lowest $^2P_{1/2}$ excited state, which corresponds to a wavelength λ of approximately 794.97 nm. Such excitation of the $^{87}$Rb atoms to their D1 absorption line causes the $^{87}$Rb atoms to absorb photons and acquire an angular momentum within the vapor cavity 22. This angular momentum is then transferred to the nuclei of the noble gas atoms, causing the noble gas atoms to spin-up. The time required to spin-up the atomic gyroscope 10 will typically depend on a number of factors, including the temperature within the vapor cavity 22, the size of the vapor cavity 22, the density of the alkali-metal and noble gas atoms, as well as other factors.

The wavelength of the laser beam 66 emitted from the pump laser source 24 can be sensed by the photodetector 40 in order to lock the pump laser source 24 wavelength λ to the D1 absorption line of $^{87}$Rb. In some embodiments, the pump laser source 24 can be connected to the first servo mechanism 96 for locking the laser beam 66 emitted from the pump laser source 24 at the precise wavelength for excitation of the $^{87}$Rb atoms to their excited states. In those embodiments in which a different source of alkali-metal atoms are used as the source pumping atoms, the wavelength of the pump laser source 24 can be varied, as necessary, to optically pump the alkali-metal atoms into their excited state or states. Once a significant fraction of the noble gas nuclei are spin-aligned along the optical pumping axis "z", the collective nuclear magnetic moments of the noble gasses create a net magnetic field $(-\lambda M_z)$ of up to several milligauss within the vapor cell 20.

The pump and sense laser sources 24,26 can be configured to operate orthogonal to each other such that the laser beam emitted from the pump laser source 24 serves as a pumping/polarization axis "z" whereas the laser beam emitted from the sense laser source 26 serves as a detection axis "x" of the atomic gyroscope 10. In preparation for initial use, and as can be further understood with respect to FIG. 3A, the atomic gyroscope 10 can be placed in a non-rotating reference frame that can be later used to calibrate the orientation of the atomic gyroscope 10. As the $^{87}$Rb atoms within the vapor cavity 22 are continually pumped to their excited states, the nuclear spins of the noble gas atoms contained within the vapor cavity 22 become polarized along the z-axis through hyperfine spin exchange in a metastable van der Waals molecule formed from the complex of an alkali-metal atom and a noble gas atom. Such interchange between atoms induces a nuclear spin polarization in the noble gas atoms that provides a desired reference for the atomic gyroscope 10.

To cancel the effect of the net magnetic field $-\lambda M_z$ produced from the nuclear spin polarization of the noble gas atoms, a static magnetic field $B_z$ can be applied along the optical pumping axis z using a number of magnetic elements 128,130 disposed within the packaging structure. The static magnetic field $B_z$ can be produced, for example, using a number of Helmholtz coils disposed on both sides of the vapor cavity 22, as shown.

The decomposed σ+ and σ− portions of the linearly polarized radiation beam experience different optical resonance frequencies as they pump the m=+1/2 and m=−1/2 states of the $^{87}$Rb atoms, respectively. Using a polarimetry technique, the σ+ and σ− components of the sense beam 84 experience different indices n+ and n−. This effect results in different phase velocities for the σ+ and σ− components of the beam, resulting in a net rotation of the forward scattered beam. As a result, the sense beam's 84 linear polarization is rotated by an angle φ, which can be understood generally from the following formula:

$$\varphi = (n_+ - n_-)\frac{1}{\lambda}. \quad (1)$$

Figure 3A:
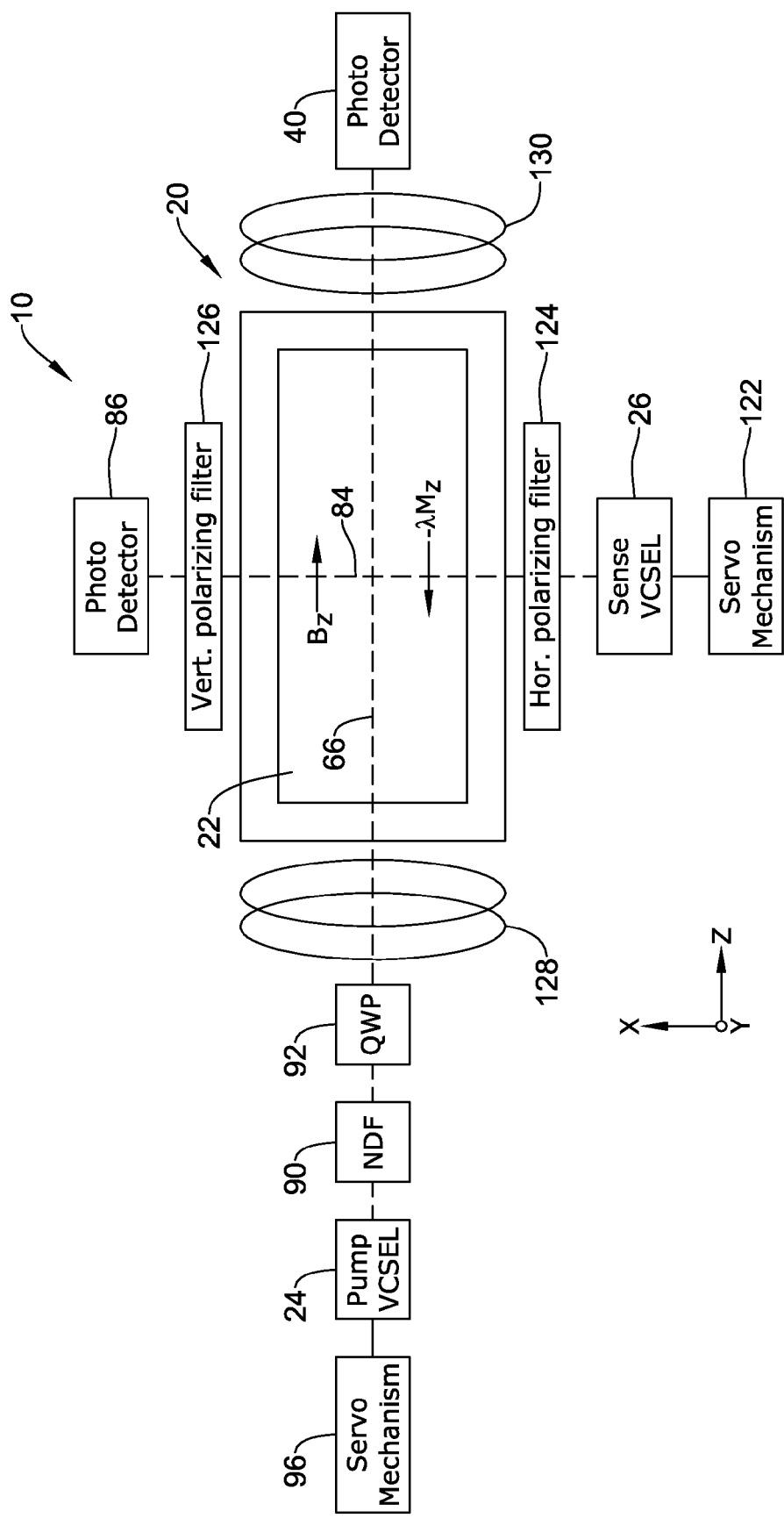
FIGS. 3A-3C are schematic views showing the operation of the illustrative atomic gyroscope of FIGS. 1-2 using a source of $^{87}$Rb alkali-metal atoms and $^{129}$Xe noble gas atoms.
Figure 3B:
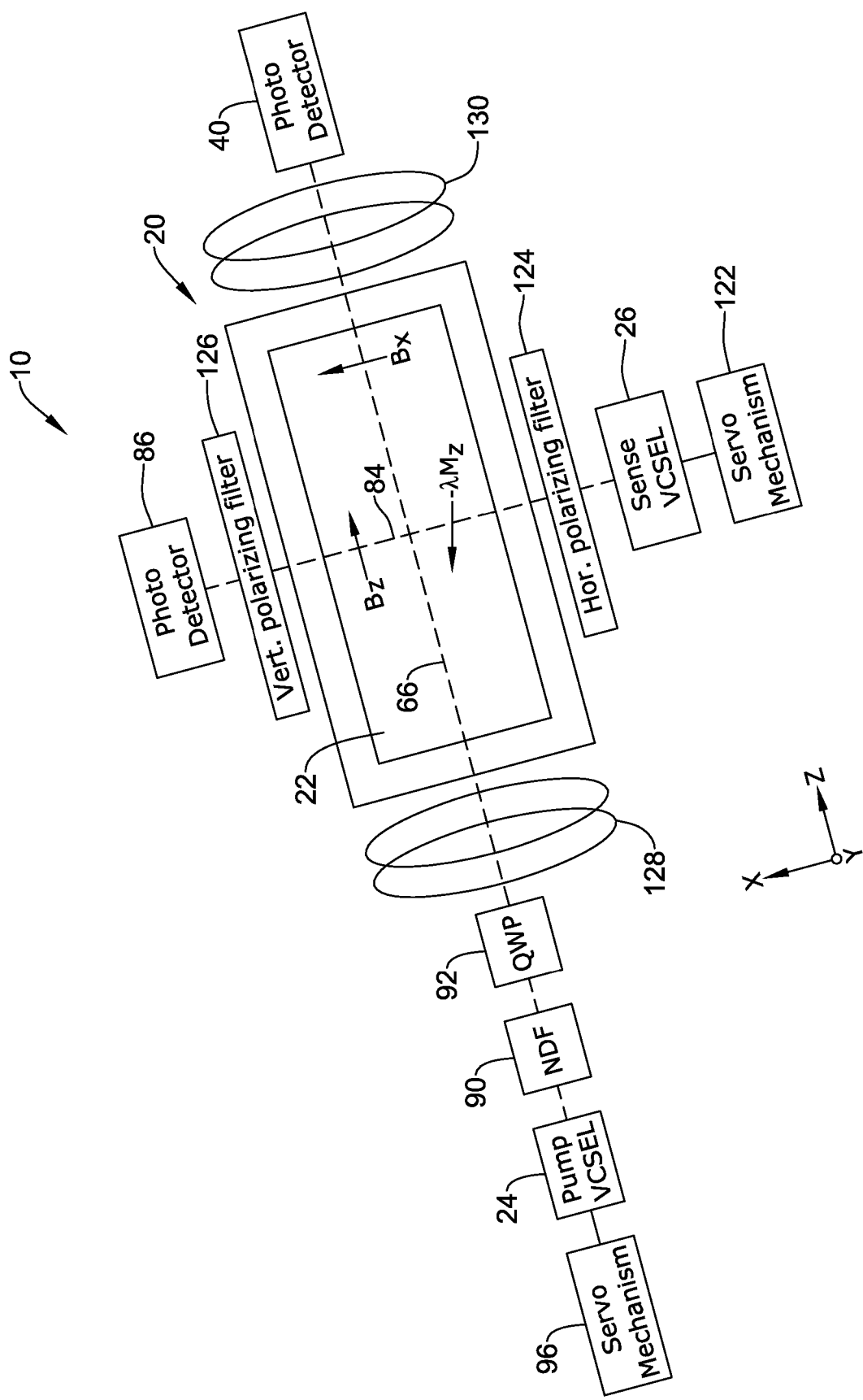

Once the magnetic fields $-\lambda M_z$ are nulled, the atomic gyroscope 10 can then be configured to sense rotation about a sense axis "y" of the atomic gyroscope 10, as further shown at time t>0 in FIG. 3B. If a rotation about the y-axis exists, the noble gas nuclear spins will not immediately follow, but will instead lag behind the mechanical rotation for a period of time. During this lag period, a net magnetic field $B_x$ exists in the atomic gyroscope 10, inducing a polarization rotation in the measured signal that is directly proportional to the mechanical rotation of the gyroscope 10. A scale factor of the atomic gyroscope 10 can then be utilized to determine the relationship between the polarization rotation in the measured signal and the mechanical rotation of the atomic gyroscope 10. Typically, only the projection of a residual magnetic field $B_x$ may induce a change in the polarization of the sense beam 84. During operation, this phenomenon helps the atomic gyroscope 10 to operate with low cross-axis sensitivity.

Figure 3C:
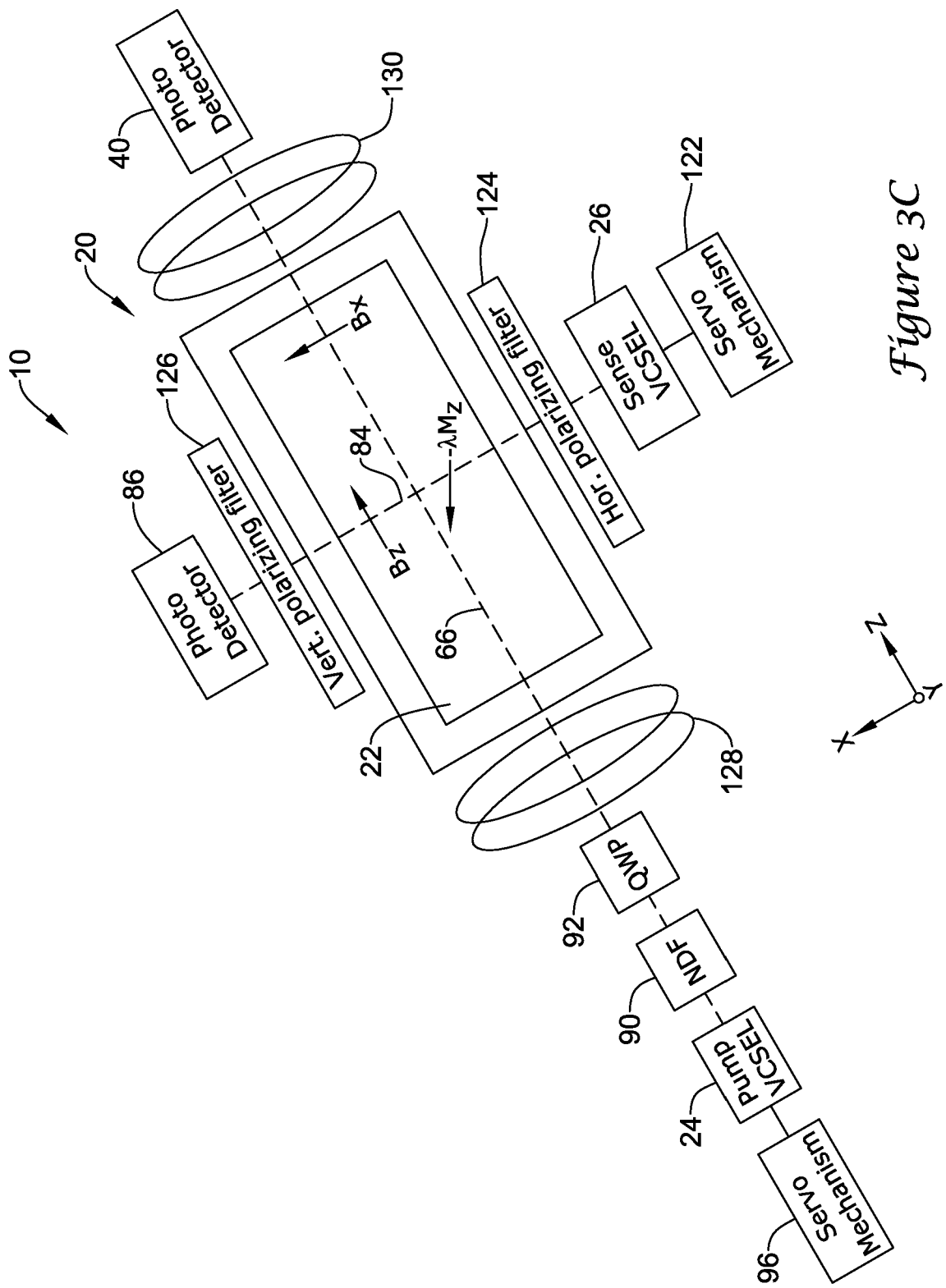

As the atomic gyroscope 10 continues to rotate, and as further shown at a later time in FIG. 3C, the angle between the applied magnetic field $B_z$ and the nuclear spin orientation of the noble gas may increase or decrease depending on the relative rates of mechanical rotation of the atomic gyroscope 10 relative to the rate of the pumping which realigns the noble gas isotopes along the present orientation. In such configuration, the noble gas orientation continuously chases the system rotation, inducing a non-equilibrium state which allows the mechanical rotation of the atomic gyroscope 10 to be measured.

The optical pumping from the pump laser source 24 can be configured to continually realign the noble gas isotopes along the new "z" axis within a relatively short response time, allowing the sense laser beam to detect subtle changes in mechanical rotation of the atomic gyroscope 10 about the y-axis. In some embodiments, for example, the response time of the system can be set so as to permit the atomic gyroscope 10 to achieve relatively high bandwidths (e.g. ≧300 Hz).

The bandwidth and sensitivity of the atomic gyroscope 10 can be made tunable over several orders of magnitude by adjusting various parameters such as vapor pressure and/or cell temperature within the vapor cavity 22. To increase the bandwidth to enable rotation detection at relatively high rates of rotation, the nuclear spins of the noble gas isotopes must be realigned periodically, otherwise the atomic magnetization direction may not be able to accurately track the rotation angle as dictated by the sense beam axis "y". Nuclear spin polarization of the noble gas atoms (e.g. $^{129}$Xe) can be achieved through spin exchange collisions with the optically pumped $^{87}$Rb vapor, which can be determined by the following formulas:

$$P_{Xe}(t) = \langle P_{Rb} \rangle (1-\exp(-\gamma_{se} t)); \text{ and} \quad (2)$$

$$\gamma_{se} = n_{Rb}\left[\sigma_{se}v + \frac{K_{xe}}{n_{Xe}}\right]; \quad (3)$$

where:
$P_{Rb}$ is the $^{87}$Rb polarization;
$n_x$ is the density;

$\sigma_{se}$ is the velocity averaged binary spin exchange cross section; and $K_{xe}$ is due to spin exchange in the Van der Waals complexes.

The time required to achieve optimal polarization of the $^{129}$Xe atoms is influenced both by the $^{87}$Rb density and the $^{129}$Xe density. Relatively low polarization times can be accomplished by maintaining a relatively high temperature within the vapor cavity 22. The time integral of the readout signal is proportional to the total angle of mechanical rotation $\Omega_y$ of the atomic gyroscope 10 about the y-axis, and is independent of the time dependence of the mechanical rotation $\Omega_y$. Furthermore, the net rotation angle generated by an arbitrary magnetic field transient is equal to zero as long as spin polarizations are rotated by a small angle during the transient. Such feature thus ensures high dynamic range and bias stability as well as high bandwidth.

The atomic gyroscope 10 can be utilized in a number of applications in which reliability, size, power consumption, vibration tolerance, and/or cost are important design considerations. In some applications, for example, the atomic gyroscope 10 can be utilized in Organic Air Vehicle (OAV) control or other navigational systems demanding a high degree of reliability and low power consumption. Other applications such as autonomous ground vehicle navigation, ground vehicle navigation, robotics, underground utility navigation and/or light aircraft control and navigation are also contemplated. In some cases, for example, the atomic gyroscope 10 can be used in personal navigational systems where GPS is not available, such as inside caves or large buildings.

Because the atomic gyroscope 10 uses the magneto-optical properties of spin-polarized vapor gas, the gyroscope 10 is relatively insensitive to B-field and optical field non-uniformities and fluctuations prevalent in nuclear magnetic resonance (NMR) gyroscopes, which measure Larmor precession. Furthermore, the atomic gyroscope has very low cross-axis sensitivity, which contributes to the complexity of many prior atomic gyroscope designs. Moreover, the atomic gyroscope 10 is relatively insensitive to frequency shifts and bias drift common in those atomic gyroscopes that pump and sense along a single axis. In contrast to MEMS vibratory gyroscopes, which utilize mechanical excitation and detection that are more susceptible to vibration, aging, and material degradation, the atomic gyroscope 10 has no moving or vibrating parts, and is thus less susceptible to errors. Also, unlike some ring laser gyroscope designs, the atomic gyroscope 10 is impervious to lock-in at low rotation rates.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes can be made with respect to various elements described herein without exceeding the scope of the invention.

What is claimed is:

1. A chip-scale atomic gyroscope, comprising:
   a vapor cell including a vapor cavity adapted to contain a vaporized source of alkali-metal atoms and noble gas atoms;
   a pump laser source adapted to produce a first laser beam along an optical pumping axis for optically pumping the alkali-metal atoms within the vapor cavity to an excited state, the first laser beam adapted to induce a nuclear spin polarization in the noble gas atoms; and
   a sense laser source adapted to produce a second laser beam along a probe axis transverse to the optical pumping axis for probing the polarization angle of the noble gas atoms within the vapor cavity.

2. The chip-scale atomic gyroscope of claim 1, further comprising a packaging structure configured to support the vapor cell.

3. The chip-scale atomic gyroscope of claim 2, further comprising a number of nested shields for magnetically and thermally shielding the packaging structure.

4. The chip-scale atomic gyroscope of claim 1, wherein the vapor cell further includes one or more storage chambers for containing a supply of alkali-metal atoms and/or noble gas atoms in communication with the vapor cavity.

5. The chip-scale atomic gyroscope of claim 1, further comprising a means for inducing magnetic fields within the vapor cavity.

6. The chip-scale atomic gyroscope of claim 1, wherein the vapor cavity further includes one or more buffer gasses.

7. The chip-scale atomic gyroscope of claim 1, further comprising:
   a first light detector in optical communication with the first laser beam transmitted through the vapor cavity;
   a first servo mechanism for locking the first laser beam at the carrier wavelength of the alkali-metal atoms, the first servo mechanism adapted to receive feedback signals from the first light detector;
   a second light detector in optical communication with the second laser beam transmitted through the vapor cavity; and
   a second servo mechanism for locking the second laser beam at a wavelength detuned from the carrier wavelength of the alkali-metal atoms, the second servo mechanism adapted to receive feedback signals from the second light detector.

8. The chip-scale atomic gyroscope of claim 7, further comprising a set of perpendicular polarization filters in optical communication with the second laser beam and second light detector.

9. The chip-scale atomic gyroscope of claim 1, wherein the pump laser source comprises a single VCSEL source.

10. The chip-scale atomic gyroscope of claim 1, further comprising a means for heating the vapor cell.

11. The chip-scale atomic gyroscope of claim 1, further comprising a passive analog thermal isolation structure in thermal communication with the vapor cell.

12. The chip-scale atomic gyroscope of claim 1, wherein said chip-scale atomic gyroscope is a microelectromechanical system (MEMS) gyroscope.

13. A chip-scale atomic gyroscope, comprising:
   a vapor cell including a vapor cavity adapted to contain a vaporized source of alkali-metal atoms and noble gas atoms;
   a pump laser source adapted to produce a first laser beam along an optical pumping axis for optically pumping the alkali-metal atoms within the vapor cavity to an excited state, the first laser beam adapted to induce a nuclear spin polarization in the noble gas atoms;
   a first light detector in optical communication with the first laser beam and vapor cavity, the first light detector connected to a first servo mechanism for maintaining the wavelength of the first laser beam at the carrier wavelength of the alkali-metal atoms;
   a means for inducing a magnetic field within the vapor cavity;
   a sense laser source adapted to produce a second laser beam along a probe axis transverse to the optical pumping axis for probing the polarization angle of the noble gas atoms within the vapor cavity;

a second light detector in optical communication with the second laser beam and vapor cavity, the second light detector connected to a second servo mechanism for maintaining the wavelength of the second laser beam detuned from the carrier wavelength of the alkali-metal atoms; and at least two perpendicular polarization filters in optical communication with the second laser beam and second light detector.

14. A method of sensing and measuring mechanical rotation of an object, the method comprising the steps of:

providing a vapor cell including a vapor cavity containing a vaporized source of alkali-metal atoms and noble gas atoms;

providing a first laser source in optical communication with the vapor cavity and a first light detector, the first laser source adapted to direct a first laser beam into the vapor cavity for optically pumping the alkali-metal atoms within the vapor cavity to an excited state, the first laser beam adapted to induce a nuclear spin polarization in the noble gas atoms;

providing a second laser source in optical communication with the vapor cavity and a second light detector, the second laser source adapted to direct a second laser beam into the vapor cavity transverse to the first laser beam for probing the nuclear spin polarization of the noble gas atoms therein;

measuring the rotation angle of the noble gas atoms within the vapor cavity; and outputting a measure of the mechanical rotation of the gyroscope.

15. The method of claim 14, further comprising of steps of:

providing a magnetic field source configured to produce a magnetic field within the vapor cavity; and activating the magnetic field source to cancel the net magnetic filed resulting from the nuclear spin polarization of the nobler gas atoms within the vapor cavity.

16. The method of claim 14, further comprising of steps of:

providing a first servo mechanism in communication with the first laser source and the first light detector; and locking the current supplied to the first laser source at a wavelength using feedback signals from the first light detector, said wavelength from the first laser source corresponding to the carrier wavelength of the alkali-metal atoms within the vapor cavity.

17. The method of claim 16, further comprising of steps of:

providing a second servo mechanism in communication with the second laser source and the first light detector; and locking the current supplied to the first laser source at a wavelength using feedback signals from the second light detector, said wavelength from the second laser source corresponding to a wavelength detuned from the wavelength of the alkali-metal atoms within the vapor cavity.

18. The method of claim 14, wherein said step of measuring the rotation angle of the noble gas atoms within the vapor cavity includes the steps of:

providing a set of perpendicular filters in optical communication with the second laser beam and vapor cavity; and nulling the sense beam radiation produced by the second laser beam.

19. The method of claim 14, further comprising the steps of:

providing a heater source adjacent the vapor cell for heating the vapor cavity; and maintaining the pressure of the alkali-metal atoms within the vapor cavity at a desired level by heating the vapor cavity with said heater source.

* * * * *